April 21, 1964     M. R. MURPHY     3,130,401
NAVIGATION SYSTEM
Filed Oct. 7, 1960     4 Sheets-Sheet 2

INVENTORS
MILFORD R. MURPHY
John Gibson Semmes
ATTORNEY

INVENTORS
MILFORD R. MURPHY
BY
John Gibson Semmes
ATTORNEY

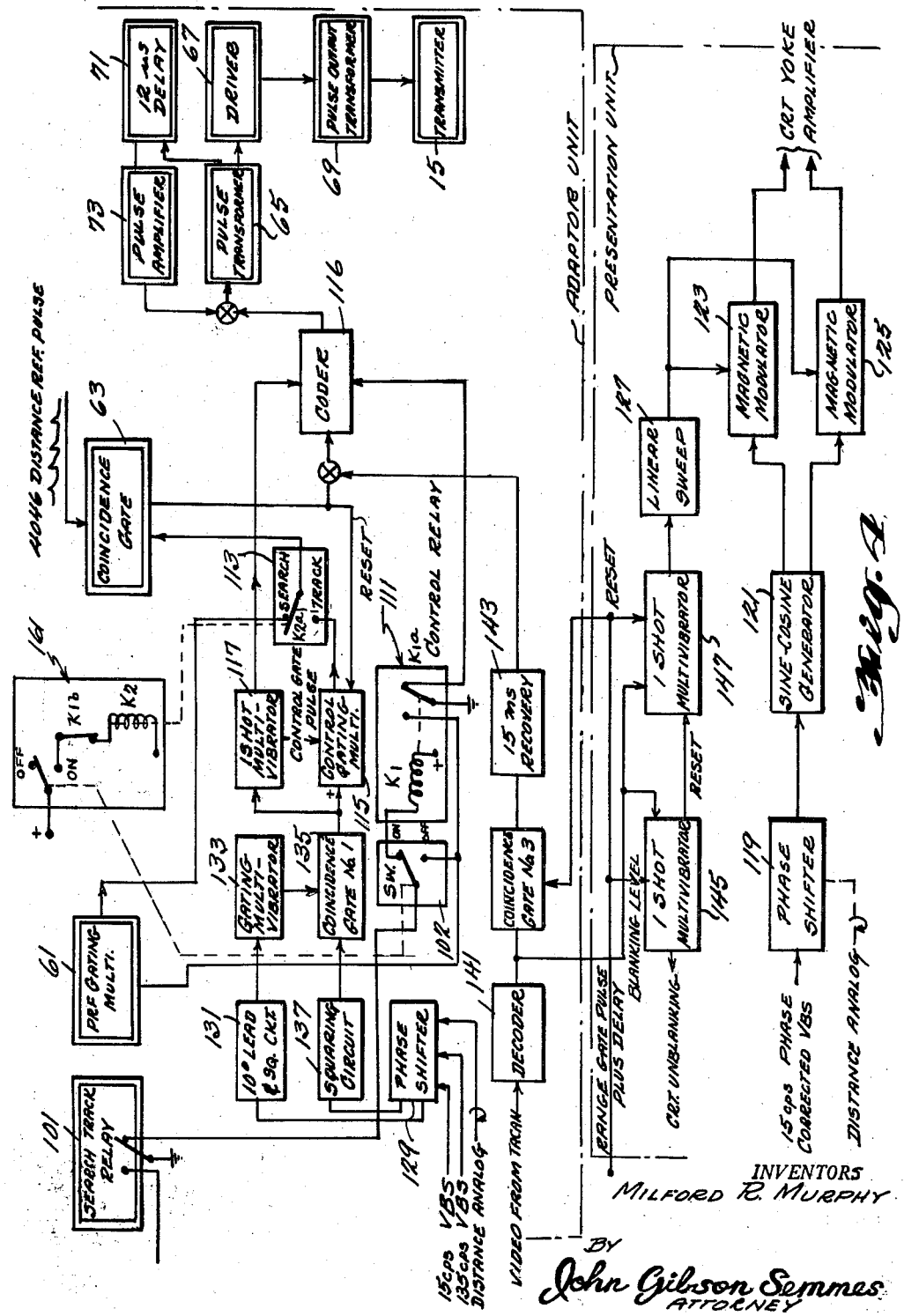

United States Patent Office 3,130,401
Patented Apr. 21, 1964

3,130,401
NAVIGATION SYSTEM
Milford R. Murphy, Arlington, Tex., assignor to Bell Aerospace Corporation, Wheatfield, N.Y., a corporation of Delaware
Filed Oct. 7, 1960, Ser. No. 61,253
6 Claims. (Cl. 343—6)

This invention relates to navigation systems and more particularly to "rho-theta" or equivalent angle and position navigation system wherein each craft, operative in a particular system, can furnish, via a central unit, the other localized craft of this particular system, their respective positions in the horizontal plane relative to the central unit and referenced to earth coordinates. In short, the invention is dedicated to anti-collision navigation irrespective of whether it be useful to surface air or space craft.

This invention utilizes a "plan position indicator" (PPI) type display in each craft to present the relative position of all participating craft such that each operator, be he navigator or pilot, may view the identical information except that each viewer's respective position is identified by a larger dot on the PPI. In commerce, the invention is to be known as Pictorial Airways Viewing Equipment and System.

Among the more cogent navigation problem the need for an efficient and practical air navigation system, particularly for air traffic control, is becoming more and more evident as the total number of aircraft using particular air facilities continually increases. Systems have been designed for such aircraft control wherein a particular aircraft may be furnished information regarding its range and bearing from a central unit.

This information is provided to the particular aircraft in the form of a reading on a dial or a range meter. Although such may be very helpful to the pilot of craft in establishing position relative to the air facility, it gives no indication of other craft in the vicinity and therefore affords no anti-collision information in itself.

Whereas, presently used rho-theta type navigation systems are composed of a multiplicity of virtually independent information systems; an objective of this invention is to integrate such independent information systems into one system such that each participating vehicular unit may have the capability of furnishing vehicular, be he pilot or navigator, the relative position (in earth coordinates referenced to the central station) of all participating vehicles, including his own relative position, on a PPI type display. This invention therefore permits utilization of available information that has not heretofore been used, by supplying the operator with new and necessary information that he has been unable to obtain before.

It is also an object of this invention to provide visual information to each participating craft within a particular vicinity which provides a pictorial representation of all such participating craft within said vicinity.

A further objective of invention is to provide an all vehicle, all weather system capable of providing needed information for vehicular traffic control and collision avoidance.

Yet another object of this invention is to provide a pictorial representation of relative positions of participating vehicles within a vicinity wherein there is utilized simple circuitry with readily available components which are low in cost and light in weight.

Yet another object of this invention is to provide such pictorial information as will augment efficiency of existing equipment and eliminating thereby the need for heavy, expensive equipment.

Still another object of this invention is to provide pictorial equipment to craft operators, pilots, navigators and the like, which does not require extensive training or new piloting techniques.

The basic system of the present invention comprises a radio set which is a vehicular carried navigation unit designed to cooperate in conjunction with a surface navigation beacon "transponder." These two equipments comprise a radio navigation system which enables an equipped aircraft to obtain continuous indications of its distance and bearing from any selected beacon station together with a presentation on the PPI "scope" of all aircraft within the vicinity which are equipped with the same radio navigation equipment.

For clarity the following dictionary of terms shall apply:

ASW—Anti-submarine warfare
CRT—Cathode ray tube
MW—Microwave
PAVE—Pictorial Airways Viewing Equipment
PPI—Plan position indicator
PRF—Pulse repetition frequency
TACAN—Tactical air navigation (systems)
VBS—Variable bearing signal It may be said that the equipment used in carrying out the invention system comprises a display "package" and an adapter "package," connecting the former package to the rho-theta navigation system.

A typical existing rho-theta navigation system is that of TACAN defined hereinabove. TACAN therefore will provide the example wherein the present invention may be illustrated. While certain details of TACAN will be discussed, further details of the TACAN system may be had by reference to the Navy publication of "Handbook Service Instructions," AN 16–30 ARN 21–2, May 1, 1956, revised September 1, 1957.

The above will be more apparent by reference to the following specification and attached drawings in which:

FIG. 4 is a schematic block diagram of modification of FIG. 3 for use in the present invention conventional circuit components being shown in double line.

Figure 1:
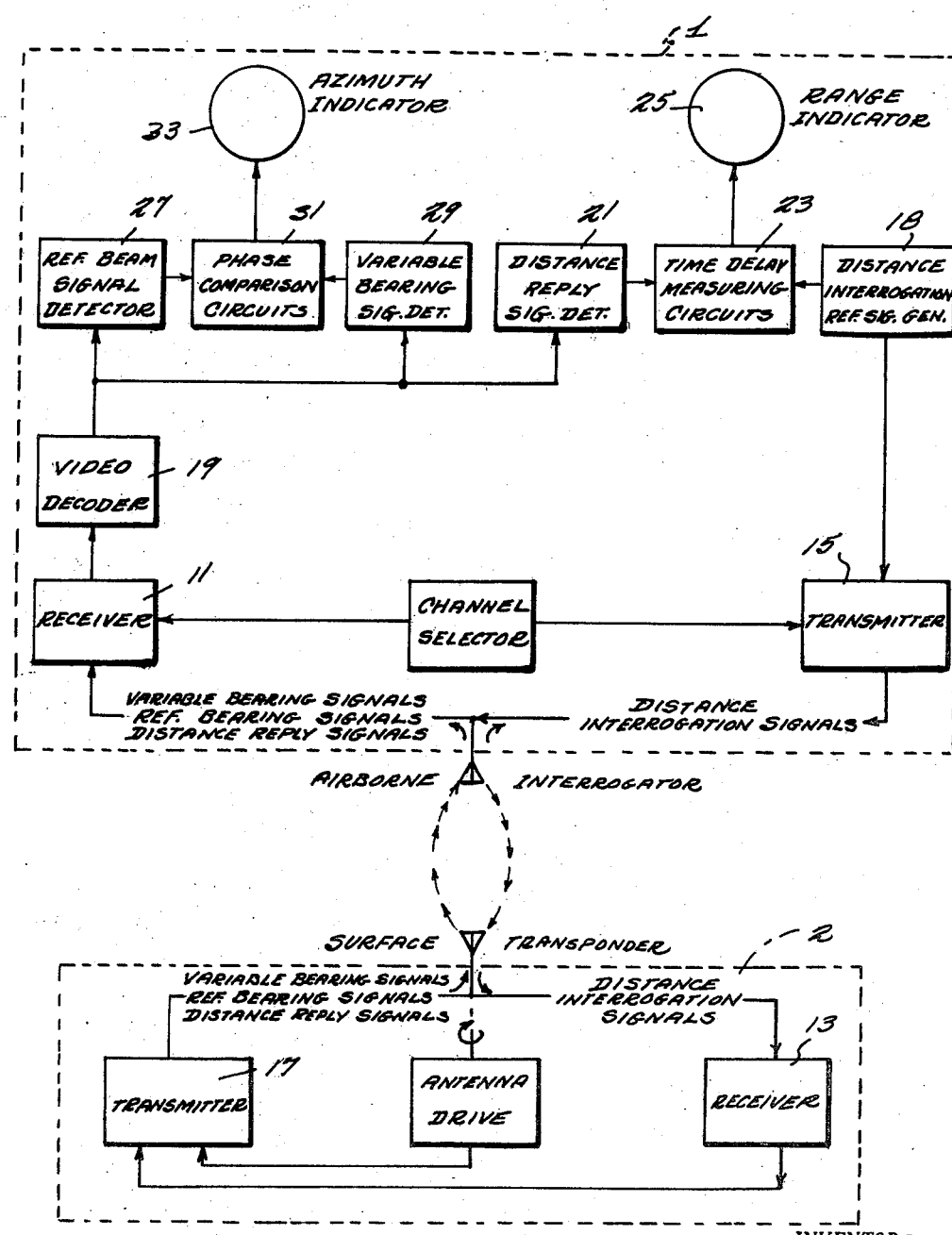
FIG. 1 is a schematic diagram of the TACAN equipment with which the present invention may be used.

In order that the present invention may be more clearly understood, reference is made to FIG. 1 which shows the simplified block diagram of the overall TACAN system. In this exemplary instance, aircraft comprise the participating craft and surface craft the central TACAN unit. Both the airborne interrogator 1 and the surface transponder 2 have receivers 11 and 13 respectively, and pulsed transmitters 15 and 17 respectively. The airborne transmitter initiates the interrogation process by radiating pulse signals. These signals known as distance interrogation pulses are detected by the surface receiver 13 and cause the surface transmitter 17 to respond with pulses which are known as distance reply pulses. The distance reply pulses are detected by the receiver 11 where special range circuits measure the elapsed time between transmission of the interrogation pulses and the reception of the reply pulses, less fixed time delay. Other range circuits receive the signals from video decoder 19 and convert the time difference into nautical miles which are displayed on the range indicator 25.

In addition to the reply pulses, the transmitter 17 continuously transmits a series of coded and modulated radio frequency pulses to provide a reference bearing signal and a variable bearing signal. These pulses are also detected by the receiver 11 and decoded. Special azimuth circuits 27, 29, 31 measure the phase difference between the reference bearing signal and the variable bearing signal.

Other azimuth circuits convert this phase difference into degrees which are displayed on an azimuth indicator 33.

This system has 126 frequency channels and will provide full service for over a hundred aircraft on each channel. The large number of channels makes the arrangement of surface beacons flexible without producing signal interference, thereby allowing for both extensive and intensive coverage in any area.

The bearing signals are converted as indicated and are displayed on an azimuth indicator which has a dial face calibrated from zero to 360°. The range indicator has a direct reading dial which indicates distance in nautical miles between the aircraft and the surface beacon.

The surface transmitter 17 and its associated driven antenna continuously transmits signals consisting of randomly spaced paired pulses, randomly spaced paired distance reply pulses, and evenly spaced and coded groups of paired pulses. In this particular system, all of these signals are amplitude modulated at 15 and 135 cycles. The 15 and 135 cycles amplitude modulations on the pulses constitute the variable bearing signals. The evenly spaced and coded groups of pulses, transmitted at rates of 15 and 135 c.p.s., constitute the reference bearing signals.

The surface beacon operates at a constant duty cycle of approximately 3600 paired pulses per second. The reference bearing signal utilizes 900 of these pulse pairs. The remaining 2700 pulse pairs consist of random and distance reply pulses in a proportion dependent on the number of aircraft interrogating the beacon. The 15 cycle reference bearing signal consists of 12 pulsed pairs spaced 30 microseconds apart while the 135 cycle reference bearing signal consists of 6 pulse pairs spaced 24 microseconds apart.

The surface beacon antenna pattern may be considered to be composed of a fundamental cardioid upon which a nine lobed pattern has been superimposed. One of the nine lobes is accurately centered at the maximum value of the cardioid and this composite pattern is rotated in space at the rate of 15 revolutions per second in a clockwise direction. Each time the maximum point of the composite pattern passes through East, the series of coded pulses constituting the 15 cycle reference bearing signal is transmitted. Every ninth of a revolution (40°) thereafter the series of coded pulses constituting the 135 cycle reference bearing signal is transmitted.

It should be noted that all transmissions from the surface beacon are amplitude modulated because the antenna pattern is developed by rotating a series of parasitic elements about a central radiator. The 15 cycle and 135 cycle amplitude modulations are each 18 percent of the average signal so that the total modulation is about 40 percent. Therefore, the surface beacon signal is composed of a series of paired pulses. The variable bearing signal consists of the 15 and 135 cycle amplitude modulation and the reference bearing signal consists of the evenly spaced and coded groups of pulses transmitted at 15 and 135 cycles.

If the surface beacon signal is observed from a bearing other than North, the variable bearing signals are shifted with respect to the reference bearing signals. This is true because the reference signals are transmitted at fixed time intervals relative to an established bearing. The variable bearing signals are transmitted by a rotating amplitude modulated antenna pattern. The phase of the variable signals varies with respect to an established bearing by a time interval, or angle, depending on the point of observation. Thus, it is seen that a measurement of phase or time difference between the reference and variable signals is a measurement of the bearing of the observer with respect to the beacon.

The above discussion points out that bearings may be determined by a measurement of the time or phase difference between the fundamental reference signal and the fundamental 15 cycle variable signal. However, this measurement does not provide sufficient accuracy for operational requirements. Therefore, the ninth harmonic (135 cycle reference and bearing signals) is utilized to increase the system accuracy by reducing the antenna sighting error and the equipment instrumentation error. Thus, the function of the 15 cycle measurement is to determine the proper bearing sector, while the 135 cycle measurement is to determine the precise bearing within that sector. In this system, one electrical degree at 15 c.p.s. corresponds to one degree in bearing. One electrical degree at 135 c.p.s. corresponds to one-ninth of a degree in bearing. Theoretically, therefore, bearings measured at the ninth harmonic frequency will be nine times more accurate than bearings measured at the fundamental frequency. The bearing signals are detected by the airborne receiver which measures the phase difference between the reference and variable signals. This phase difference is converted into degrees by the azimuth indicator.

In the absence of interrogating signals, the beacon continuously transmits about 2700 randomly timed pulse pairs per second. When distance information is desired, an interrogation pulse is initiated by the airborne transmitter 15. This interrogation is detected by the surface beacon and used to trigger the surface beacon transmitter 17. Consequently, some of the 2700 random pulse pairs will now be synchronized with a respective interrogating pulse. These synchronized pulses are called the reply pulses. The reply pulses are detected by the airborne receiver 11 which measures the time difference between the interrogation and reply signals. This time difference is converted into nautical miles by the range indicator 25.

Figure 2:
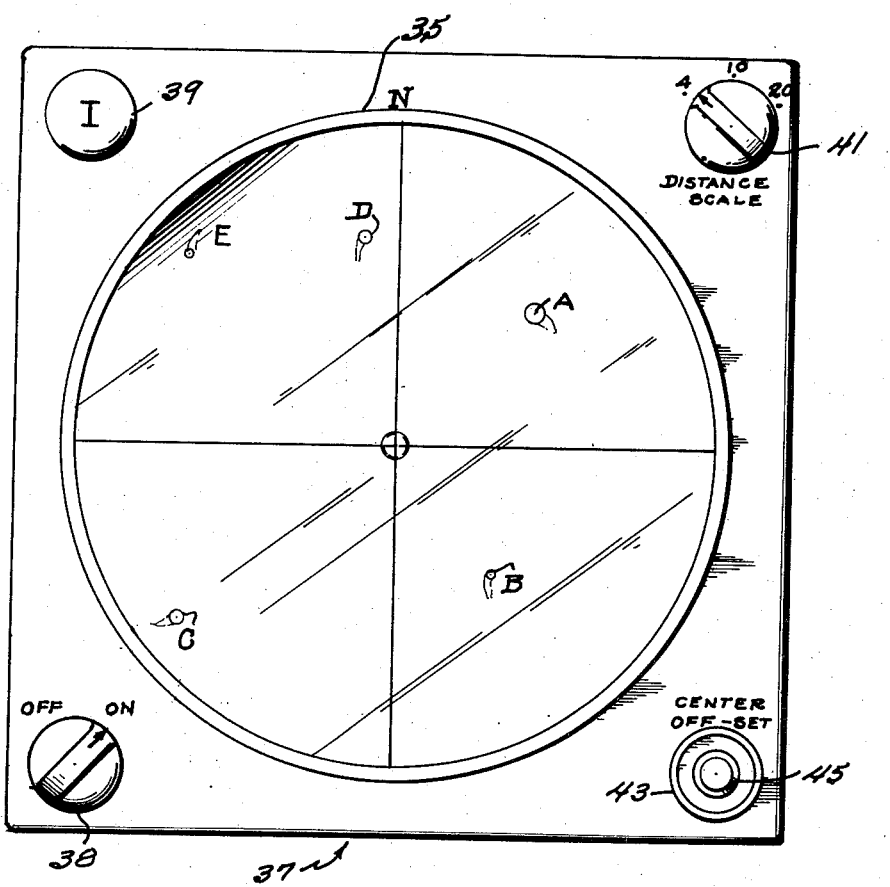
FIG. 2 is a view of the PPI scope and control panel of the present invention.

FIG. 2 illustrates the presentation of the information within each aircraft made available by the present invention. The unit 37 presents the information delivered to a cathode ray tube PPI type display 35, designed for mounting in a convenient position on the instrument panel.

There are three signal control knobs and one dual unit on the face of the instrument. The purpose of the on-off switch 38 is self-explanatory. The "I" control knob 39 controls the intensity of the displayed image to permit viewing easily in direct sunlight or in a dark cockpit. The knob 41 controls the scale of the display and has convenient range positions representing slant distance to beacon in nautical miles. The knob 43 controls the right-left centering and the smaller knob 45 controls the up-down centering of the display. This will allow each operator-pilot to shift the display to cover the area of most interest to himself. Long persistence phosphor can be used in the cathode ray tube to display red images with a wave length of approximately 6400 angstroms for proper night vision adaptability. The symbol "O" represents the transponder (TACAN) beacon consisting, in this embodiment, of the surface equipment shown in FIG. 1. Azimuth position is relative to this unit and this symbol only moves when the centering controls are adjusted. The symbol "A" represents an interrogating aircraft as viewed by its pilot and the symbols "B" through "E" represent other vehicles, air or surface, operating on the same pictorial system. Since the particular display shown in FIG. 2 represents a display in aircraft "A" its position is represented with a larger dot. The operator and/or navigator of each aircraft can always easily identify their vehicle by this larger symbol characteristic. The means of obtaining the larger signal will become obvious as the description of the present invention proceeds. It should be noted that the direction of the long trail will also give an indication of the direction of movement of any of the particular aircraft.

In the event another aircraft is in the immediate vicinity of the interrogating aircraft, it has been found that there will usually be a reduction in the intensity of the interrogating aircraft's symbol. This may serve as an additional warning of a potentially dangerous situation.

Transparent overlays with geographical features depicting the particular air facility may be placed in front of the cathode ray tube. This will allow safer air traffic control regardless of weather conditions and traffic density at all air facilities and will provide collision avoidance information for everyone in the operating area. This would also provide a method whereby all aircraft can be accurately flown along specific ground tracks.

The equipment modification of the TACAN unit for use with the present invention involves no modification of the central unit. The changes required are the rerouting of several of the range circuits and adding the presentation unit.

Figure 3:
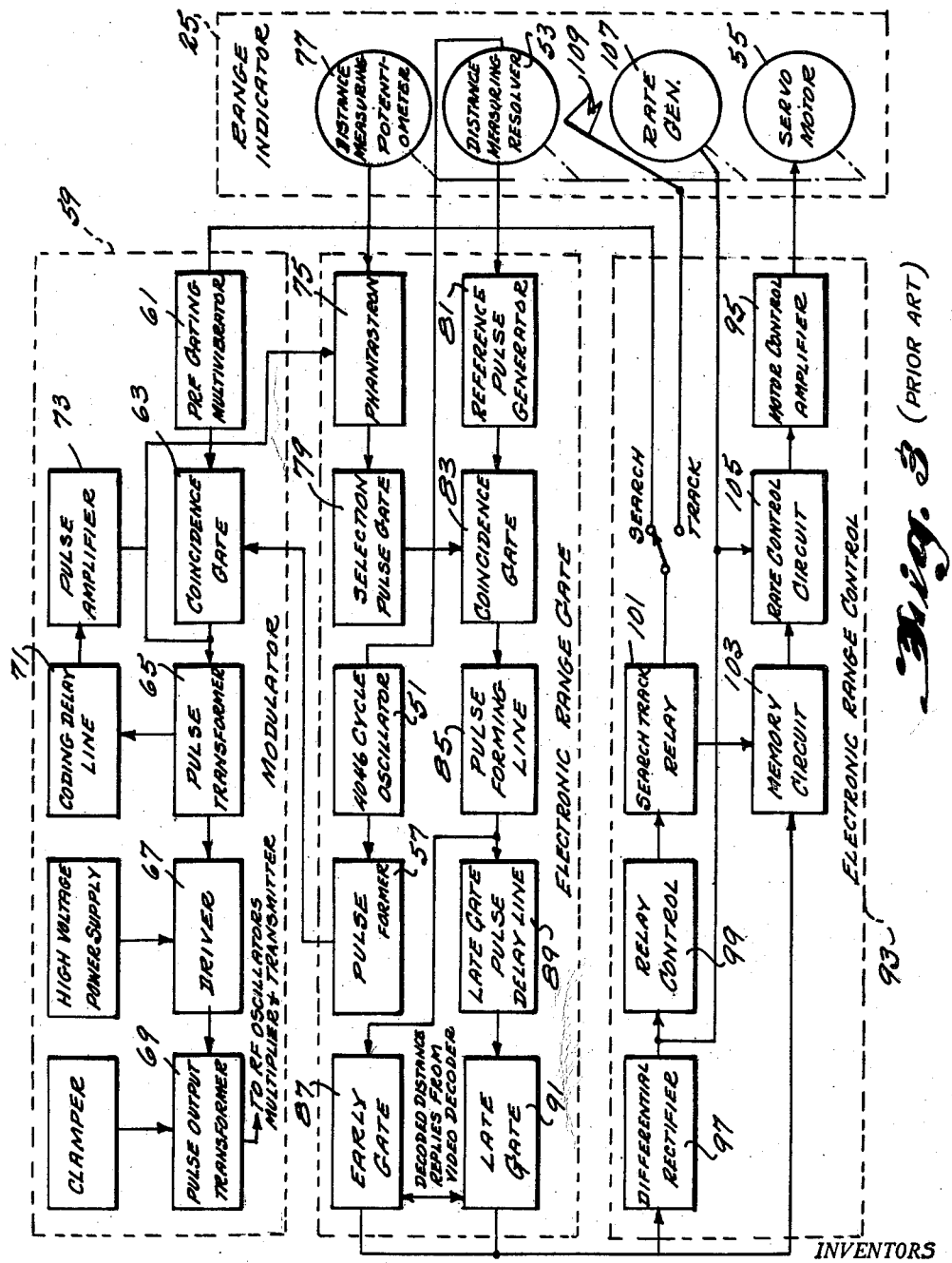
FIG. 3 is a detailed schematic diagram of the prior art TACAN system range circuits.

Accordingly, a discussion of the range circuit of the TACAN unit as depicted by FIG. 3 will clarify the method of adapting the present invention to that particular unit.

The range measurement starts with the generation of a 4046-cycle sine wave by oscillator 51 for use as a reference signal for time measurements. This frequency was selected because one cycle represents 20 nautical miles in range which is a convenient division of the 200 miles range of the system.

The 4046-cycle signal is fed to a distance measuring resolver 53 which is driven by a servo-motor 55 in the range indicator. At the same time the 4046-cycle signal is passed through pulse former 57 which produces sharp accurate pulses which are then fed to the modulator 59. The gating multivibrator 61 in the modulator generates a gating pulse with an unstable pulse repetition frequency. The gating pulse which determines the PRF of the distance interrogations is designed to drift between 120 and 150 pulses per second when the distance signals are not being detected (searching condition) or to drift between 22 and 33 pulses per second when distance reply signals are being detected (tracking condition).

The first 4046-cycle pulse that occurs in the gate 63 then triggers the modulator which in turn pulses the R-F circuits and causes the transmission of a pulse-pair. The pulse that triggers the modulator is also used to initiate a variable width gate generated by phantastron circuit 75. The width of the gating pulse is repeatedly made to increase (made to search) from 0 miles to 200 miles every twenty seconds by the servo-motor driven potentiometer 77 in the range indicator 25. The trailing edge of the variable width phantastron pulse determines the start of a selector pulse in the selection pulse gate 79.

The 4046-cycle phase shifted signal from the range indicator is shaped into narrow pulses by the reference pulse generator 81. The first such pulse that is coincident in gate 83 with the selector pulse initiates the early gating pulse in early gate 87. This early gating pulse is delayed in delay line 89 to form the late gating pulse in the late gate 91.

It should be noted that the time at which the early gate is initiated is determined primarily by the phantastron delay and the phase-shift of the 4046-cycle pulse. Since both the phantastron delay and 4046-cycle signal phase shift are continuously varying, the time positions of the gating pulses are continuously varying relative to the transmitted pulse-pair. Essentially the phantastron positions the gating pulses within twenty miles of the correct distance while the amount of phase shift of the 4046-cycle pulses determines accurately the distance within this twenty mile range.

The gating pulses control the operation of the motor in the following manner. The output of the gates are in opposition so that there will be no control voltage until there is an unbalance in the input to the gates. Under these conditions, the motor is driven at its searching speed. When there is no reply, only random pulses and noise are continuously fed to the motor control circuit. However, since these pulses are completely random, as many occur during one gate period as the other over any prolonged period of time, and no unbalance occurs.

When a reply is received, it consistently appears in synchronization with one gate or the other. The circuit is designed so that if more than six reply pulses are received the motor speed will be decreased to the tracking rate when the reply pulses appear in the range gate. When tracking on a reply, the motor speed and direction are controlled by the degree of unbalance at the output of the gates. In each case the motor is driven to correct the unbalance and maintain the range potentiometer 77 and resolver 53 in the position that provides the proper phantastron delay and phase shift.

The electronic range control 93 establishes the search or track condition for the range circuits from the coincidence signals from the range gate and develops voltages to control the range indicator in both search and track. Only when at least six coincident pulses occur in the range gate will the differential rectifier 97 operate the relay control to cause the search track relay 101 to switch from search to track. Tracking is maintained only so long as pulse coincidence continues to occur and this coincidence can occur only as long as the received pulses have a constant time relationship with reference to the interrogation pulses.

When relay 101 switches from search to track the interrogating rate (PRF) is changed from 150 to 30 (nominal) pulses per second and the memory circuit 103 is also activated. Memory circuit 103 is essentially a sum circuit and maintains the operation of the system in the track position should the signal fade temporarily. If the reply signal does not reappear within a predetermined finite time the system returns to the search position. However, if the reply signal reappears, then the circuit continues tracking from the point at which the reply signal originally faded. A rate generator 107 is placed in the system to control a rate control circuit to prevent hunting of the servo-motor while in its track condition.

The modification required of the TACAN system illustrated in FIG. 3 is shown as a functional block diagram in FIG. 4. The only changes required are to reroute three circuits and to bring out particular signals as shown in FIG. 4. The three circuits are as follows: the circuit from the PRF gating multivibrator 61 to search track relay 101 and the input and output of the coincidence gate 63.

It is necessary to make the above changes so that during the track mode the interrogations are controlled by the variable bearing signals (15 c.p.s., 135 c.p.s.) in order to define the azimuthal location of the craft when it transmits its respective distance information. Operation in the search mode is not affected by the modification shown in FIG. 4. Specifically, the circuit from the search track relay 101 that normally goes to the PRF gating multivibrator 61 is modified to go through the on-off control 102 of FIG. 4. The "ON" position of the "ON-OFF" control 102 slaves relay $K_1$ to the search-track relay 101 which furnishes the search-track function for the PRF gating multivibrator. Relay $K_1$ also controls $K_2$ which changes the source of the control gate pulse when the system proceeds from search to track mode. Switching this control to "OFF" takes the respective craft off the system of FIG. 4 and the airborne unit of FIG. 3 is back in its normal state. "ON-OFF" switch 161 is ganged with the "ON-OFF" control 102 to complete the connection between the two systems. The other modification is in the input and output circuit of coincidence gate 63. The input is switched to accept the control gate pulse from the system of FIG. 4 in place of the signal from the PRF gating multivibrator 61 during the track mode and the output is processed through a coder 116 as shown in FIG. 4. The coder is disabled during search and when the control switch 102 is in the "OFF" position.

The system of FIG. 4 is capable of receiving and processing particular intelligence from the conventionally used TACAN system of FIG. 1 in such a manner that each aircraft of a particular system can furnish, via the central unit, to the other localized craft of this particular system their respective positions relative to the central unit with reference to a single direction such as magnetic north. The system utilizes a PPI (plan position indicator) type display in each craft, such as shown in FIG. 2, to present the relative position of all participating craft. Accordingly, each pilot is viewing the identical information except that each viewer's respective position is identified by a larger display dot as indicated in FIG. 2.

The system of this invention consists of presentation equipment, computing and processing circuitry, and a modification to the airborne TACAN unit shown in FIG. 3. No additional equipment or modification would be required at the central unit so far as the operation of this system is concerned; however, for the convenience of monitoring the aircraft positions it would be necessary to furnish the associated central unit with the same information as is presented in each aircraft to supplement the present air traffic control equipment such as surveillance radar, voice communication, etc.

The presentation equipment consists of a CRT and an amplifier (not shown) to operate with the equipment as shown in FIG. 4 to produce the presentation shown in FIG. 2. The computing and processing circuitry includes the timing, switching and resolving circuitry.

The circuitry of the present invention is required to perform four major functions: develop a PPI sweep which is phase locked with the 15 c.p.s. reference signal; commutate the transmission of distance information as a function of the 15 c.p.s. variable bearing signal and the respective position of each craft; measure, code and sequentially transmit respective distance information; and decode, measure and present distance information of all participating craft.

The phase corrected 15 c.p.s. variable bearing signal from the TACAN system is utilized to develop the PPI sweep. This signal is reshaped, if necessary, given a magnitude reference level and phase shifted in phase shifter 119 as a function of a distance from the central unit. The signal is then divided into two signals which are in turn phased to obtain two signals that are in time quadrature by means of the sine-cosine generator 121. The 15 c.p.s. reference signal from TACAN could be used for the above function, but it would be required to change the pulse into a sine wave. The above solution is more accurate and requires fewer components and is, therefore, more desirable. The two signals are applied to the signal winding of two magnetic modulators 123 and 125 of the multiplying type while a linear sweep from 127 is applied to the excitation windings of the two modulators each time a distance transmission is received. The purpose of the phase shifter 119 is to compensate for the transit time required for the transmitted signal to travel from the central unit to a respective airborne unit which is representative of the slant distance from the central unit.

Since, indirectly, the reference 15 c.p.s. signal is used to generate the angular sweep for the PPI type presentation, the angular sweeps in all the participating craft are phase locked. Thus, it is now only necessary to commutate the distance analog transmissions of each craft in accordance with the variable bearing signal which defines the bearing of the craft when it is commutated. This provides the distance analog transmission of each craft to be sequenced in accordance with its respective position and the 15 c.p.s. variable bearing signal from the TACAN central unit. The 15 and 135 c.p.s. variable bearing signals are phase led in the phase shifter 129 as a function of the slant distance to compensate for the transient time required for the transmitted signal to travel from the craft to the central unit. The 15 c.p.s. variable bearing signal is used to develop a 5 millisecond selector gate pulse in gating multivibrator 133 and is applied to a coincidence gate 135 such that the 135 c.p.s. variable bearing signal, after passing through squaring circuit 137, can be used to initiate the distance data transmission.

As explained above, the pulse repetition frequency gating multivibrator 61 operates at approximately a 150 c.p.s. during search and switches to a PRF in the range of 30 c.p.s. for the track mode. The low PRF is actually a signal that varies randomly about 30 c.p.s. in an effort to minimize the probability of a range gate being pulled out by a foreign signal. Since a PRF of approximately 30 c.p.s. is required for the range circuitry in the TACAN receiver described above, this system utilizes the variable bearing signal to commutate the distance analog transmissions. These transmissions are used in the basic TACAN system range circuitry plus an added distance interrogation (without data transmission) spaced between the commutated transmission to satisfy the sample rate requirement of the range circuitry. The addition of the distance interrogation could be accomplished in several ways, but in the present equipment the use of the one shot multivibrator 117 having a 33 ms. nominal output is the most advantageous. High tolerance components are used in the 33 ms. one shot multivibrator to decrease the probability of the range gate being affected from the replies of other craft. The 33 ms. one shot multivibrator 117 operates multivibrator 115, which is the control gate used for data transmission, except that in this instance multivibrator 117 clamps the delayed pulse of the coder 116 to prevent a distance date transmission from being transmitted. The output of multivibrator 115 is passed to coincidence gate 63. The output pulse from coincidence gate 63 is used to reset the control gating multivibrator 115 in a manner such that it is possible to get only one distance reference pulse through gate 115 per opening.

The next requirement for the system of the present invention is to code and transmit distance information when a participating unit is sequenced by the central unit. As shown in FIG. 4, the transmission of distance information is initiated by the coincidence of the control gate pulse and the distance reference pulse in the coincidence gate 63. The output pulse from gate 63 starts the transmission of a two-pulse pair code from the coder through the pulse transformer 65, driver 67, pulse output transformer 69, and transmitter 15. The reply of this transmission from the central TACAN unit is received decoded in the decoder 141, correlated with the range gate pulse and processed through a 15 ms. recovery circuit 143 to initiate another two pulse pair code in the coder 116, which ends the data transmission. The spacing in real time between the two transmissions (which is less the induced time delays) is analogous to the respective slant distance.

Therefore, a system describing the presence and respective locations of a multiplicity of participating craft operating from a common central reference has been developed into an electromagnetic intelligence. It is now required that each craft have the capability to receive the electromagnetic information and to transduce this information into a visual intelligence. The information is received and processed by the presentation unit as shown in FIG. 4. The first two-pulse pair code of a distance transmission is received, decoded and processed to operate a one-shot multivibrator 145 to produce a dot on the center of the CRT and also to start a linear sweep which is utilized in the PPI circuitry to provide a radial sweep for presenting the distance analog. The second two-pulse pair code is processed, decoded to produce a dot on the CRT that defines the position of the craft that has provided the respective data transmission. The dot representing the location of the subject craft appears on the PPI scope as the enlarged dot shown and described in FIG. 2. The trailing edges of the dot producing pulses from multivibrator 145 are used to reset the linear sweep circuitry in preparation for subsequent data processing.

The reset circuitry for the one shot multivibrator 147 is such that two pulses are required for a reset operation. Each craft receives its own data transmissions via the central unit and essentially in the same manner as described above except that the probability of overlapped data reception is decreased by using the range gate function from the TACAN unit to favor the reception of its respective distance transmissions. This favoritism is accomplished by utilizing the range gate function to furnish the reset feature of the linear sweep circuitry through multivibrator 147 and also to change the bias on the CRT intensity control through multivibrator 145 such that a craft's own location will be defined in the PPI presentation by the much brighter dot, as illustrated in FIG. 2.

The prime purpose of the foregoing system is to furnish each participating craft of a particular system a visual plot of the operating system per se by means of a CRT display. The invention as disclosed herein is specfically for air traffic control at fixed installations for preventing mid-air collisions and enhancing traffic safety. However, it is obvious that this system could be adapted for other purposes such as directing a search, air-sea rescue, group mobility of vehicles and also for anti-submarine warfare type missions.

Additionally, it should be recognized that the system of the present invention has carefully been designed such that should PPI circuitry develop comparatively high errors, the utility of the system is not adversely affected. This feature is inherent in the design, since all the angular and distance data, including the respective data, is processed through the same circuitry, in each craft, and is affected in the same manner. For example, a craft may have a PPI angular sweep error of a few degrees relative to the central control unit, but all the craft in this local area will be shifted the same number of degrees on this particular display. This azimuthal error virtually loses its significance since the prime interest in using the present system is the separation distance between the craft.

It is further noted that, even though a time-base generator can be used in each craft to space distance date transmissions, real time is used since the coding facility, including time delay in the central control unit, is common to all the participating units and is by far more accurate. Any constant error associated with the central unit would virtually not affect the radial distance separation of vehicles since such error is common to all vehicles.

As has been discussed, the system intelligence utilizes the central unit, such as the TACAN central unit, as a data link. The intelligence information could be telemetered directly from one participating craft to another without passing through the central unit. This would require an additional telemetering transmitter and receiver system in each participating aircraft to function as the data link in place of the central unit.

If aircraft using systems with different central units are within the communicating range of each other's telemetry equipment, then a different frequency would be required for use with each system. At present, without the central unit in the data link, there is no means of compensating for transit time of the signal from one participating aircraft to another. With the central unit as the data link, this compensation can easily be provided as previously discussed with reference to FIG. 4.

Whereas participating aircraft and a surface craft central unit have been illustrated, the system lends itself to any multi-vehicular navigation system of either mixed surface, air, or space design. It is especially adapted to ASW operation as will be apparent from the foregoing.

I claim:

1. A navigation control system including a plurality of participating craft, each of said craft having a telemetering transceiver, means for transmitting reference bearing signals and variable bearing signals to said craft, means in each said transceiver for receiving said reference bearing signals and variable bearing signals, means in each said transceiver for communicating distance information to other participating craft as a function of said reference bearing and variable bearing signals, plan position display means in each said craft, means for producing a PPI sweep on each of said displays which is phase locked with said reference bearing signal and means for visually presenting the position of all said craft relative to each other on each said plan position indicator within respective craft.

2. An apparatus of claim 1 further comprising means in each of said craft for intensifying the visual representation of the location of said interrogating craft.

3. A navigation control system including a central control unit and a plurality of participating craft comprising: means for transmitting reference bearing signals and variable bearing signals from said control unit, a cathode ray tube with an associated plan position display in each said craft and means for producing a PPI sweep on each of said displays which is phase locked with said reference bearing signal, means for transmitting distance interrogation signals from each of said crafts, means to commutate said distance signals from said crafts as a function of said variable bearing signals and the respective position of each craft relative to said central unit, means for receiving distance reply signals from said central unit in response to said interrogation signals and means for visually presenting the position of all of said craft relative to the central unit on said plan position indicator in each said crafts.

4. Apparatus of claim 3 further comprising means in each said craft for intensifying the visual representation of the location of said interrogating craft.

5. A method of providing an air navigation system for a plurality of craft about a central unit comprising the steps of transmitting a reference bearing signal and a variable bearing signal from said central unit, developing a plan position indicator sweep in each aircraft which is phase locked with said reference bearing signal, transmitting distance interrogation signals from each of said craft, commutating each of said distance interrogation signals as a function of said variable bearing signal and the respective position of each of said craft, receiving said distance information signals in each of said craft and presenting the distance information of all of said craft on each of said indicators.

6. The method of claim 5 further comprising the step of intensifying the presentation within each participating craft which represents that particular aircraft.

References Cited in the file of this patent

UNITED STATES PATENTS 2,666,198     Wallace _____ Jan. 12, 1954